United States Patent [19]
Mehlert et al.

[11] Patent Number: 5,277,278
[45] Date of Patent: Jan. 11, 1994

[54] ESCALATOR CALIPER BRAKE ASSEMBLY WITH ADJUSTABLE BRAKING TORQUE

[75] Inventors: Martin Mehlert, Nienstaedt; Wolfgang Michalik, Hanover, both of Fed. Rep. of Germany

[73] Assignee: Otis Elevator Company, Farmington, Conn.

[21] Appl. No.: 837,171

[22] Filed: Feb. 18, 1992

[51] Int. Cl.$^5$ .................... F16D 49/00; F16D 59/00
[52] U.S. Cl. .................................. 188/70 B; 188/74; 188/76
[58] Field of Search ............... 188/70R; 70B, 72.9, 71.1, 74, 24.11, 24.12, 192/65; 187/73

[56] References Cited

U.S. PATENT DOCUMENTS

| | | | |
|---|---|---|---|
| 643,231 | 2/1900 | Parmiter | 188/24.11 |
| 1,386,120 | 8/1921 | Kuenneth | 188/74 |
| 2,830,679 | 4/1958 | Butler | 188/729 X |
| 2,917,135 | 12/1959 | Hirgel | 188/71.1 X |
| 3,305,048 | 2/1967 | Brilando | 188/24.12 |
| 4,066,152 | 1/1978 | Pascal | 188/729 X |
| 4,270,631 | 6/1981 | Kobelt | 188/72.9 |

FOREIGN PATENT DOCUMENTS

| | | | |
|---|---|---|---|
| 847111 | 8/1952 | Fed. Rep. of Germany | 188/24.11 |
| 525705 | 9/1921 | France | 188/24.12 |
| 1151249 | 1/1958 | France | 188/74 |
| 977318 | 12/1964 | United Kingdom | 188/70 R |

*Primary Examiner*—Mark T. Le

[57] ABSTRACT

An escalator is provided with a caliper disc brake for stopping movement of the steps in cases of emergency. The disc is mounted on the main drive sprocket shaft, and the caliper is normally held away from the disc. When power is removed from the drive, the caliper is set on the disc to stop further movement of the steps. The braking torque of the brake assembly is adjustable to allow use of one basic assembly with escalators having different rises. The adjustment is accomplished by moving the center of gravity of the brake pads toward or away from the pivot axis of the brake lever. The brake can also be finely tuned at installation to provide an optimum stopping distance and time so that a too abrupt stop is avoided.

6 Claims, 5 Drawing Sheets

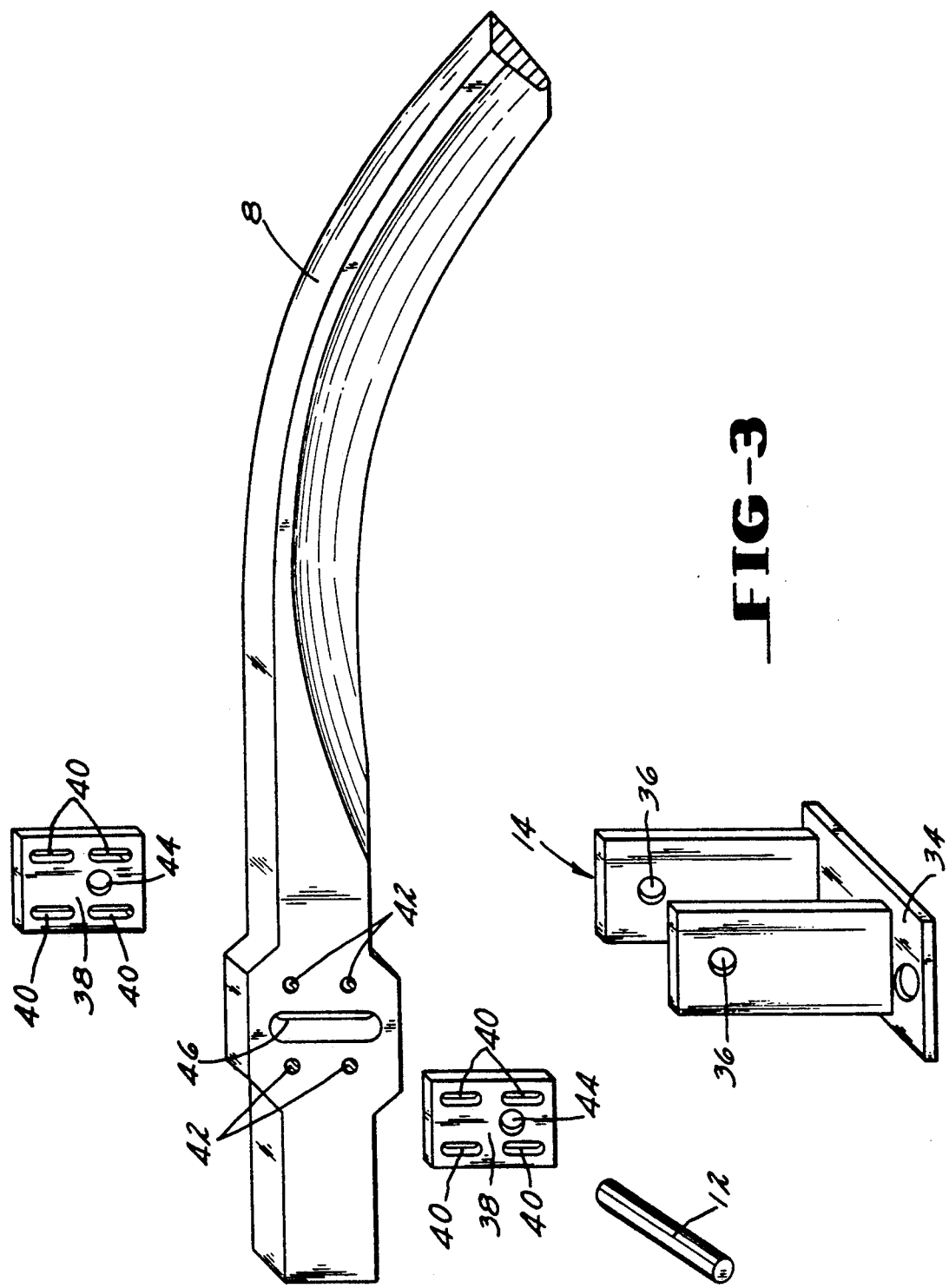

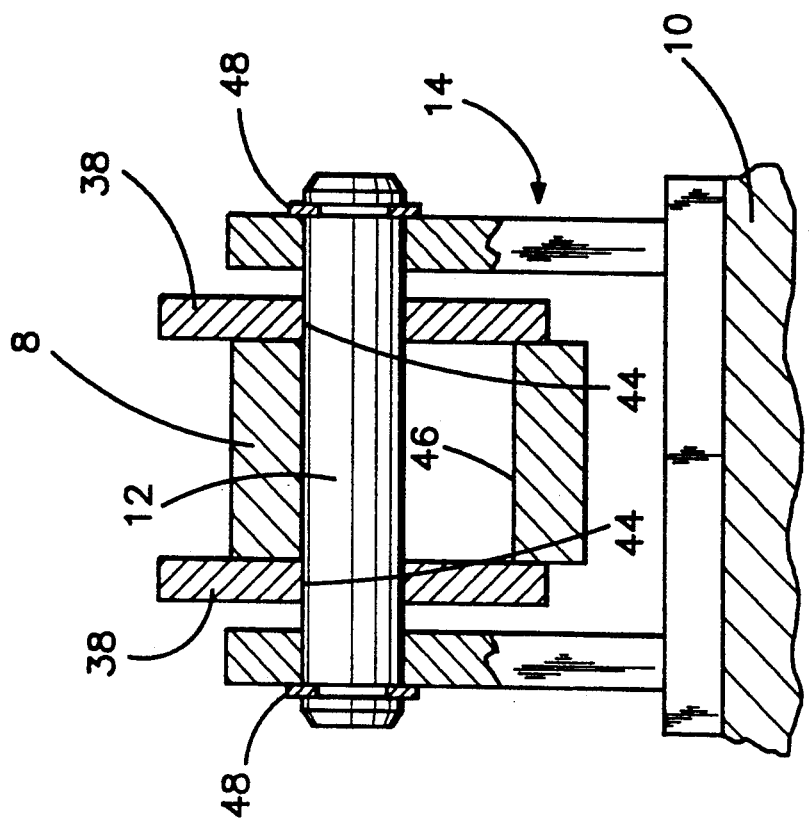
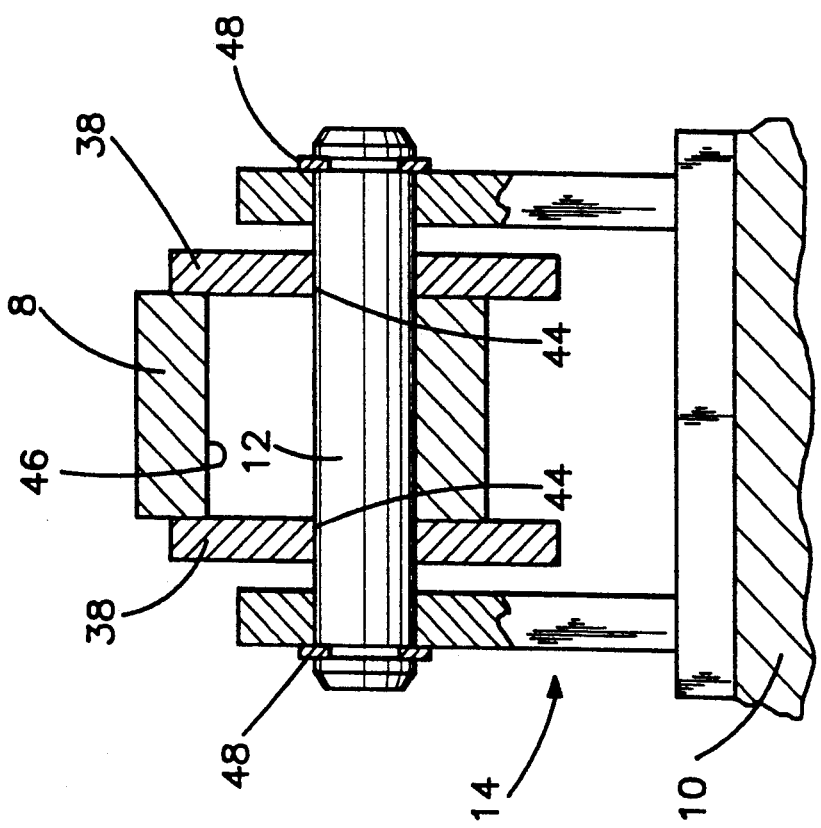

ESCALATOR CALIPER BRAKE ASSEMBLY WITH ADJUSTABLE BRAKING TORQUE

TECHNICAL FIELD

This invention relates to an escalator brake, and more particularly to an escalator brake assembly which is capable of brake torque adjustment.

BACKGROUND ART

Escalators are provided with caliper disc brakes which are used to selectively prevent movement of the main drive sprocket shaft. These brakes will set whenever power to the escalator is shut off, either in an emergency situation, or when the escalator is shut down for servicing, or otherwise.

Escalators are made having different rises, or lengths, due to different building or architectural requirements. Longer escalators are of course heavier than the shorter ones, and therefore require a higher or larger braking force to hold the steps against movement. If a single common disc brake assembly is used for escalators of all rises or lengths, then the brake used must be capable of applying sufficient braking force to the drive shaft to hold in place the steps of the longest of the escalators using the brake. Thus the brake used must be capable of developing a high braking torque. When such a high torque brake is used on a short escalator, stoppage of the steps in emergency situations will occur in an undesirably abrupt manner. The only solution to this problem is to use different torque brakes for different length escalators, which creates manufacturing and inventory problems. At the present time, for preassembled escalators, the brakes are preadjusted and set in the factory. They cannot be tuned in the field. It would be desirable to have an escalator brake which has an adjustable torque so that the same brake assembly can be used for different length escalators, and so that the brake can be adjusted if necessary in the field.

DISCLOSURE OF THE INVENTION

This invention relates to an escalator brake which has an adjustable brake arm that allows the braking forces to be adjusted both on assembly of the escalator and in the field. The adjustment of the braking force depends on being able to adjust the included angle α between a vertical line passing through the axis of the brake disc, and a radial line passing through the axis of the brake disc and through the center of gravity of the brake pad. The greater the angle α, the longer the effective brake arm and the greater the braking force. The adjustment can be accomplished in several ways, for example: the pivot axis of the brake lever can be moved vertically to change the angle α; or the brake lever can be provided with a plurality of brake pad fastening points whereby the brake pads can be moved on the brake lever toward or away from the pivot axis of the brake lever.

It is therefore an object of this invention to provide an escalator brake which can be adjusted for use on different length escalators.

It is a further object of this invention to provide an escalator brake of the character described which can be adjusted in the field to provide a preferred stopping distance for the escalator in emergency situations.

It is an additional object of this invention to provide an escalator brake of the character described wherein the braking force of the brake is changed by adjusting the effective length of the brake arm.

It is another object of this invention to provide an escalator brake of the character described wherein the braking force can be changed without changing the spring force used to set the brake.

These and other objects and advantages of the invention will become more readily apparent from the following detailed description of several embodiments thereof when taken in conjunction with the accompanying drawings, in which:

BRIEF DESCRIPTION OF THE DRAWINGS

FIG. 3 is a fragmented exploded view of a preferred embodiment of a brake arm mounting assembly for use in the invention;

FIG. 4 is a cross sectional view of the mount assembly of FIG. 3 showing the brake arm mounted for a high braking force mode of the invention;

FIG. 5 is a cross sectional view similar to FIG. 4 but showing a low braking force mount arrangement;

BEST MODE FOR CARRYING OUT THE INVENTION

Figure 1:
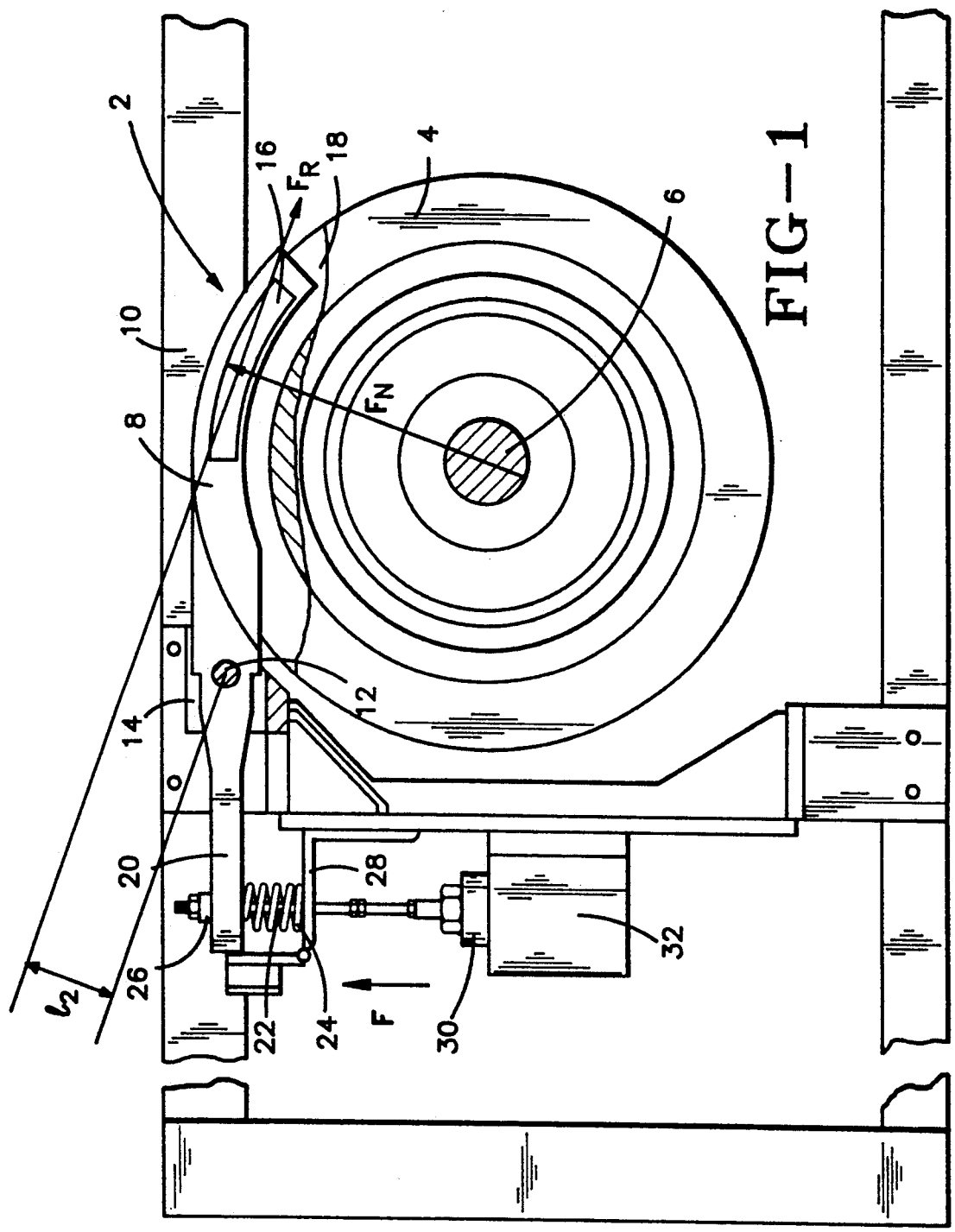
FIG. 1 is a side elevational view of the brake assembly of this invention.

Referring now to the drawings, FIG. 1 shows a brake assembly denoted generally by the numeral 2 which can be modified to operate in accordance with this invention. The assembly 2 includes a brake disc 4 which is secured to the main drive shaft 6 of the escalator. A brake arm 8 is mounted on the escalator truss 10 and pivots about a pin 12 mounted in a bracket 14 on the truss 10. Brake pads 16 are mounted on the sides of the brake arm 8 and selectively engage the sides of a groove 18 in the rim of the brake disc 4. The arm 8 has an extension 20 that is engaged by a catch rod 22 and a coil spring 24. A nut/washer 26 is threaded onto the rod 22 and engages the top of the arm extension 20. The rod 22 and nut/washer 26 will pull the arm 8 in a counterclockwise direction about the pin 12, while the spring 24 which is seated on a bracket 28 secured to the truss 10 biases the arm 8 in the clockwise direction. The rod 22 is operably connected to the core piece 30 of a solenoid 32 which is mounted on the truss 10. When the main power supply to the shaft 6 is on and the escalator is running, the solenoid 32 is energized and the rod 22 pulls on and pivots the arm 8 about the pin 12 to compress the spring 24 and lift the brake arm 8 and pads 16 away from the disc 4. Any time power to the solenoid 32 is interrupted, the spring 24 will be able to pivot the arm 8 so as to set the brake assembly 2 and stop rotation of the shaft 6. Typically this will occur when the escalator is intentionally shut off, or in the event that the step chain should break.

Figure 2:
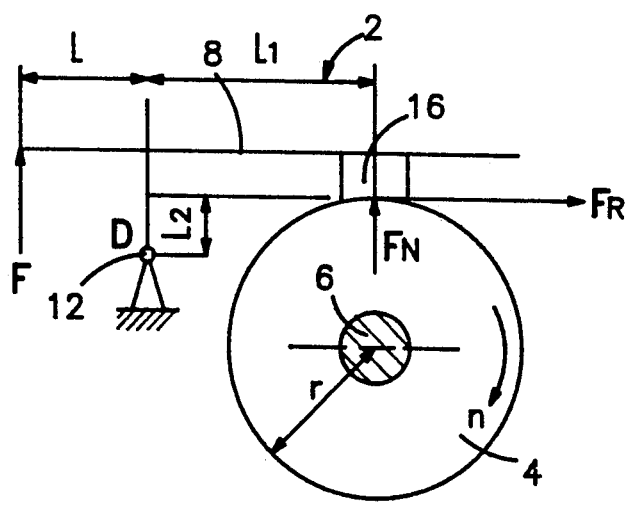
FIG. 2 is a schematic depiction of the brake assembly for clarifying the operational theory of the invention.

Referring now to FIG. 2, there is shown a schematic representation of the brake assembly 2, from which an analysis of the various forces involved can be derived.

The following equations define the relationship between the various forces and linear dimensions in the assembly:

$$\Sigma M_{(D)} = \phi = (F_N \cdot l_1) - (F_R \cdot l_2) - F \cdot l;$$

and $$F_R = \mu \cdot F_N;$$

and $$F = \frac{F_N(l_1 - \mu l_2)}{l}$$

Wherein:
$M_{(D)}$ is the torque around the pivot point D defined by the pin 12;
F is the spring force;
$F_N$ is the normal force of the disc 4 against the brake pad 16;
$\mu$ is the coefficient of friction of the brake pad;
$F_R$ is the friction force;
l is distance between the vector of the spring force and the pivot point D;
$l_1$ is the distance between the pivot point D and the vector of the normal force $F_N$; and
$l_2$ is the vertical distance between the pivot point D and a plane passing through the center of gravity of the brake pads.

The brake torque $M_{Br} = F_R \cdot r$, where r is the radius of the brake disc, or stated another way $M_{Br} = \mu \cdot F_N \cdot r$.

$$F_N = \frac{F \cdot l}{l_1 - \mu \cdot l_2},$$

and assuming that the spring force F remains constant due to the use of a common spring for all of the brake assemblies; then $$M_{Br} = \frac{F \cdot l \cdot \mu \cdot r}{l_1 - \mu \cdot l_2}$$

wherefrom it will be noted that $M_{Br}$ is proportional to $l_2$, i.e., when $l_2$ increases, the brake torque increases, and vice versa. There are two ways to change the dimension $l_2$, one being to adjust the position of the brake arm, and the other being to adjust the position of the brake pads on the brake arm. A combination of the two approaches can also be used.

Referring to FIGS. 3-5, one embodiment of an adjustable brake arm mount is shown that can be used to adjust the brake torque. The mount bracket 14 is in the form of a clevis and includes a base 34 which is bolted to the truss. The pivot pin 12 is mounted in aligned openings 36 in each leg of the clevis. A pair of adjustable plates 38 are mounted on the arm 8 by means of screws (not shown) which extend through vertically elongated openings 40 and into threaded openings 42 in the sides of the arm 8. The plates 38 are thus vertically adjustable on the sides of the arm 8. Each plate 38 has an opening 44 therein to receive the pin 12, which also extends through a vertically elongated opening 46 in the arm 8. The plates 38 thus provide a vertically adjustable pivot axis for the arm 8. FIG. 4 shows the plates 38 adjusted to provide a high pivot axis for the brake arm 8, and FIG. 5 shows the plates 38 adjusted to provide a low pivot axis for the brake arm 8.

Figure 6:
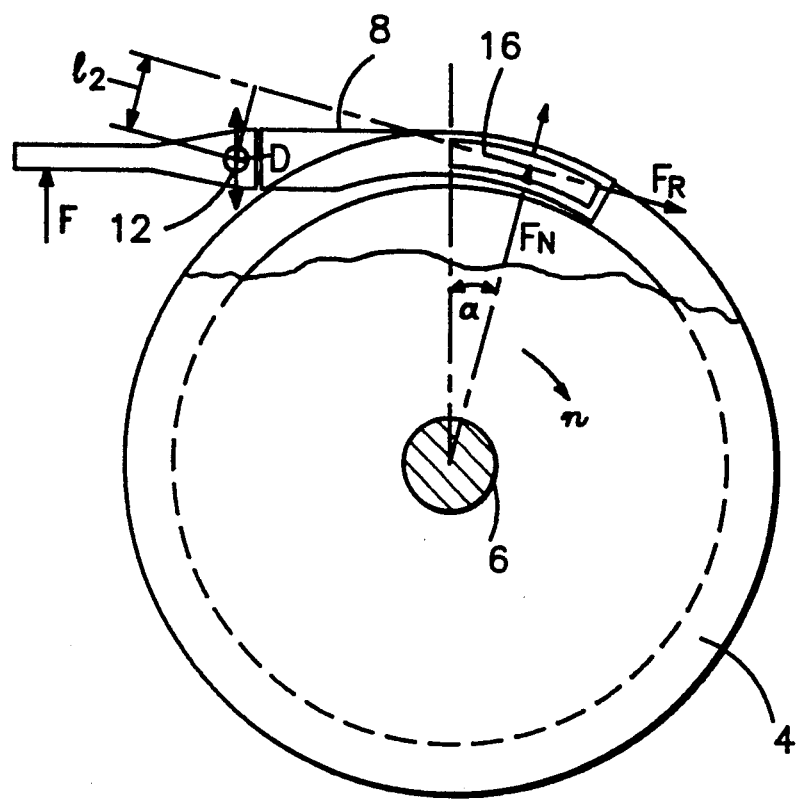
FIG. 6 is a schematic side view of the brake assembly showing the brake arm in the FIG. 4 mounting arrangement.
Figure 7:
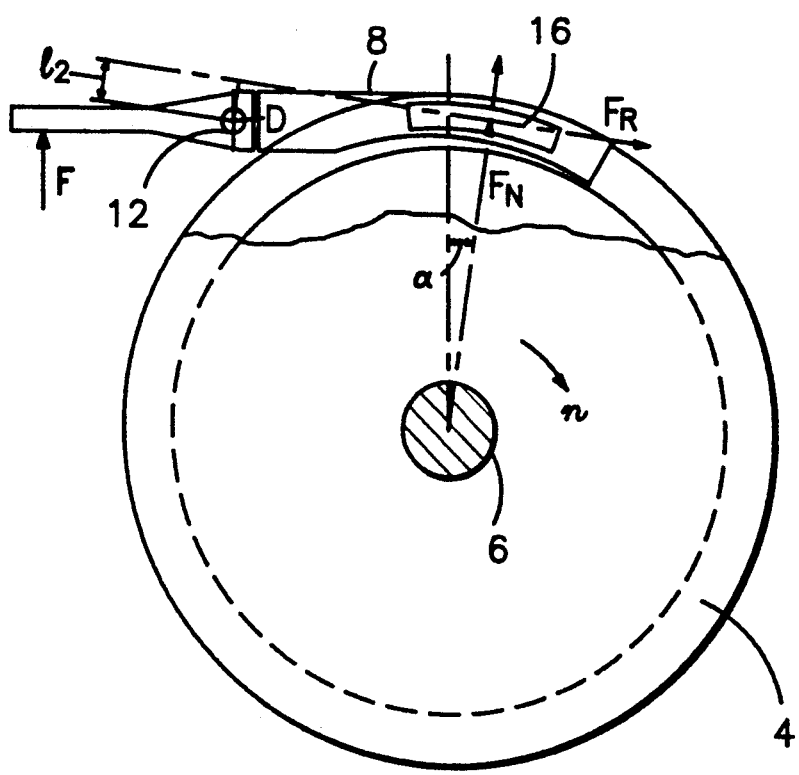
FIG. 7 is a schematic side view of the brake assembly showing the brake arm in the FIG. 5 mounting arrangement.

FIG. 6 illustrates the result of providing the high brake arm pivot point of FIG. 4, and FIG. 7 illustrates the result of providing the low pivot point of FIG. 5. A comparison of FIGS. 6 and 7 shows that the high pivot point provides a greater value of $l_2$ and also provides a larger included angle $\alpha$ between the vector line of $F_N$ and a vertical line passing through the axis of the drive shaft 6 and the disc 4. Thus the brake torque $M_{Br}$ will be greater for the high pivot setting than for the low pivot setting.

Figure 8:
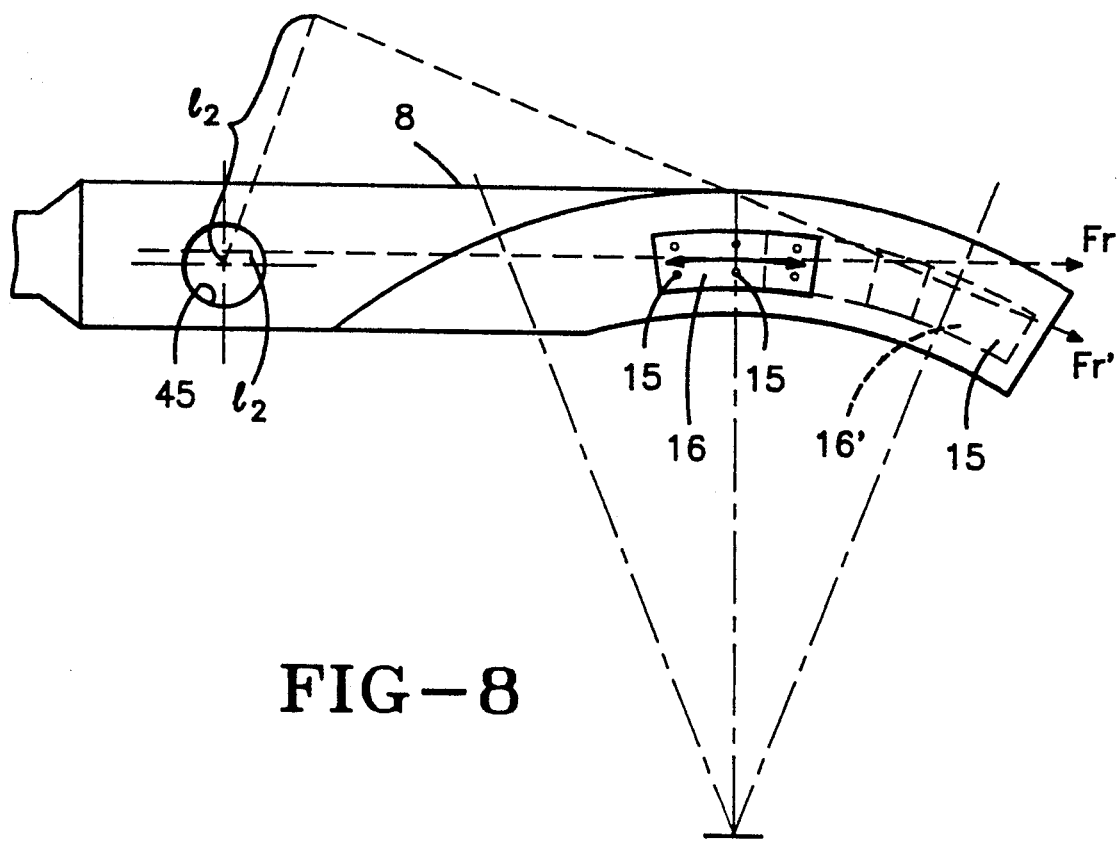
FIG. 8 is a fragmented side view of the brake arm modified for use in an embodiment of the invention which utilizes movable brake pads for varying the effective length of the brake arm.

FIG. 8 shows a third approach to providing a brake assembly of the character described which has an adjustable brake torque. In the embodiment shown in FIG. 8, the brake arm 8 has a round pivot pin hole 45 and uses a fixed pivot axis. The brake arm 8 has a series of pairs of brake pad-fixing points 15 which provide a series of possible locations for the brake pad 15. Preferably the distance between each pair of points 15 is equal to one-third of the length of the brake pad 16. It will be noted from FIG. 8 that when the brake pad is in the position 16 indicated by solid lines, an $F_r$ vector is produced which results in a small $l_2$ dimension. In contrast, when the brake pad is in the position 16' indicated by broken lines, an $F_{r'}$ vector is produced which results in a larger $l_2$ dimension. Thus, the brake torque produced at the 16' pad location is greater than that produced at the 16 pad location.

It will be readily appreciated that the escalator brake assembly of this invention allows the use of a single assemblage of common components to serve as a brake for escalators of different lengths. Simple adjustments can be made in the factory to provide a specification brake torque for each different length escalator. Once the escalator is installed in the field, the field mechanics can fine tune the brake torque in order to provide the most desirable stopping distance for the escalator.

Since many changes and variations of the disclosed embodiments of the invention may be made without departing from the inventive concept, it is not intended to limit the invention otherwise than as required by the claims.

What is claimed is:

1. A disc brake assembly for stopping rotation of a drive shaft, said assembly comprising:
    a) a brake disc mounted on the drive shaft for concurrent rotation therewith;
    b) a brake arm having a brake pad mounted thereon for selective engagement with said brake disc to selectively stop rotation of said disc and drive shaft, said brake arm being mounted for movement about a pivot axis offset from said brake disc, and said brake arm having an effective brake force-governing length defined by the distance between a brake pad normal force vector line which passes through the axis of rotation of the drive shaft and through the center of gravity of said brake pad, and a second line which is parallel to said normal force vector line, and which passes through said pivot axis;
    c) first means engaging said brake arm to hold the latter in a brake release position relative to said brake disc;
    d) spring means engaging said brake arm to bias the latter against said first means and toward a brake setting position relative to said brake disc; and e) means for changing said effective length of said brake arm for adjusting the braking force of said brake assembly whereby said braking force can be increased or decreased.

2. The disc brake assembly of claim 1 wherein said means for changing comprises a brake arm mount assembly operable to permit upward and downward shifting of said brake arm pivot axis.

3. The disc brake assembly of claim 2 wherein said mount assembly comprises a fixed mount bracket and a brake arm pivot pin assembly mounted on said mount bracket and brake arm, said pivot pin assembly defining said brake arm pivot axis; and means for enabling relative upward and downward movement of said pivot pin assembly with respect to one of said mount bracket and brake arm.

4. The disc brake assembly of claim 3 wherein said means for enabling comprises a vertically elongated opening in said brake arm through which said pivot pin passes, and a pair of adjustment plates flanking said opening and vertically shiftable relative to said brake arm, each of said plates comprising a circular opening therein for receiving said pivot pin, and means for fixing said plates to said brake arm upon achievement of a desired vertical adjustment thereof to properly position said pivot axis.

5. The disc brake assembly of claim 1 wherein said means for changing comprises brake pad mounting means operable to permit shifting of said brake pad along said brake arm toward and away from said brake arm pivot axis.

6. The disc brake assembly of claim 5 wherein said brake pad mounting means comprises sets of spaced apart pairs of mounting sites, with each pair thereof being further offset by an equal distance d from said pivot axis; and spaced apart pairs of mounting means on said brake pad with adjacent pairs of said mounting means being offset on said brake pad by said distance d; and there being a greater number of pairs of mounting sites than mounting means whereby said brake pad can be secured to said brake arm at a number of different locations, each of which positions the center of gravity of said brake pad a different distance from said pivot axis.

* * * * *